United States Patent
Tiainen et al.

(10) Patent No.: US 11,677,347 B2
(45) Date of Patent: Jun. 13, 2023

(54) POSITIONING DEVICE FOR PRODUCING A ROTATIONAL POSITION SIGNAL AND AN EXCITATION DEVICE FOR PRODUCING AN EXCITATION SIGNAL FOR A RESOLVER

(71) Applicant: Danfoss Editron OY, Lappeenranta (FI)

(72) Inventors: Risto Tiainen, Lappeenranta (FI); Matti Iskanius, Lappeenranta (FI)

(73) Assignee: Danfoss Editron Oy, Lappeenranta (FI)

( * ) Notice: Subject to any disclaimer, the term of this patent is extended or adjusted under 35 U.S.C. 154(b) by 275 days.

(21) Appl. No.: 16/806,530

(22) Filed: Mar. 2, 2020

(65) Prior Publication Data
US 2020/0295686 A1    Sep. 17, 2020

(30) Foreign Application Priority Data

Mar. 12, 2019   (EP) .................................... 19162090

(51) Int. Cl.
*H02P 21/06* (2016.01)
*H02K 19/36* (2006.01)

(52) U.S. Cl.
CPC ............. *H02P 21/06* (2013.01); *H02K 19/36* (2013.01)

(58) Field of Classification Search
CPC ........ H02P 21/06; H02P 2203/03; H02P 6/16; H02K 19/36; G01D 5/2073; G01B 7/00; G05B 2219/35442; G05B 2219/50303
See application file for complete search history.

(56) References Cited

U.S. PATENT DOCUMENTS 4,795,954 A * 1/1989 Sakurai .................. G05B 19/33
                                                        318/605
5,134,397 A * 7/1992 Eyerly ................. G01D 5/2073
                                                        318/605
(Continued)

FOREIGN PATENT DOCUMENTS

CN       102721362 A    10/2012
CN       102737825 A    10/2012
(Continued)

OTHER PUBLICATIONS

Extended European Search Report for European Patent Application No. 19162090.5 dated Sep. 5, 2019.

*Primary Examiner* — Bickey Dhakal
(74) *Attorney, Agent, or Firm* — McCormick, Paulding & Huber PLLC

(57) ABSTRACT

A positioning device (101) for producing a position signal indicative of a rotational position of a resolver is presented. The positioning device comprises a signal interface (102) for receiving alternating signals (V_cos, V_sin) from the resolver and a processing system (103) for generating the position signal based on position-dependent amplitudes of the alternating signals and on polarity information indicative of a polarity of an excitation signal (V_exc) of the resolver. The processing system is configured to recognize a polarity indicator, such as a change of frequency or phase, on a waveform of one or both of the alternating signals and to determine the polarity information based on the recognized polarity indicator. Thus, the polarity information related to the excitation signal is included in the alternating signals and therefore there is no need for a separate signaling channel for transferring the polarity information to the positioning device.

9 Claims, 5 Drawing Sheets

(56) References Cited

U.S. PATENT DOCUMENTS

| | | | | |
|---|---|---|---|---|
| 6,239,571 | B1 * | 5/2001 | Shimahara | G01D 5/2086 |
| | | | | 340/870.18 |
| 7,205,916 | B1 | 4/2007 | Stolan | |
| 2008/0218391 | A1 * | 9/2008 | Nishimura | H03L 7/08 |
| | | | | 341/116 |
| 2013/0249452 | A1 * | 9/2013 | Shinohara | G01D 5/2073 |
| | | | | 318/400.04 |
| 2016/0238409 | A1 * | 8/2016 | Tiainen | G01D 5/204 |

FOREIGN PATENT DOCUMENTS

| | | | | |
|---|---|---|---|---|
| CN | 103986387 | A | 8/2014 | |
| CN | 104527773 | A | 4/2015 | |
| CN | 105897079 | A | 8/2016 | |
| EP | 2700909 | A1 * | 2/2014 | ........... G01D 5/2073 |
| EP | 3 056 867 | A1 | 8/2016 | |
| JP | 2005-49100 | A | 2/2005 | |
| JP | 2011-99828 | A | 5/2011 | |
| JP | 2012-103025 | A | 5/2012 | |

\* cited by examiner

POSITIONING DEVICE FOR PRODUCING A ROTATIONAL POSITION SIGNAL AND AN EXCITATION DEVICE FOR PRODUCING AN EXCITATION SIGNAL FOR A RESOLVER

CROSS-REFERENCE TO RELATED APPLICATION

This application claims foreign priority benefits under 35 U.S.C. § 119 to European Patent Application No. 19162090.5 filed on Mar. 12, 2019, the content of which is hereby incorporated by reference in its entirety.

TECHNICAL FIELD

The disclosure relates to a positioning device for producing a position signal indicative of a rotational position of a resolver. Furthermore, the disclosure relates to an excitation device for producing an excitation signal for a resolver.

BACKGROUND

An electric drive system comprises typically an electric machine for driving an actuator and a converter for controlling the electric machine. The actuator can be for example a wheel or a chain track of a mobile machine or a tool of an immobile machine. The converter can be for example a frequency converter. In many cases, an electric drive system comprises a resolver for detecting a rotational position of a rotor of an electric machine and a converter is configured to control the operation of the electric machine at least partly based on the detected rotational position of the rotor. The resolver can be for example a variable reluctance "VR" resolver which receives an alternating excitation signal and produces first and second alternating signals whose amplitudes are dependent on the rotational position of the resolver so that envelopes of the first and second alternating signals have a mutual phase shift. A variable reluctance resolver is advantageous in the respect that there is no need for windings in the rotor of the resolver. It is however also possible that the resolver is a wound-rotor resolver that comprises brushes or a rotary transformer for transferring an excitation signal to a rotor winding of the resolver. The converter is configured to transmit the excitation signal to the resolver and to receive the above-mentioned first and second alternating signals from the resolver and to generate a position signal indicative of the rotational position based on the amplitudes of the first and second alternating signals and on a polarity of the above-mentioned excitation signal of the resolver.

In many electric drive systems, an electric machine is a multi-winding machine that comprises two or more winding systems each of which is supplied with a separate converter. The electric machine may comprise for example two three-phase stator windings so that there is an angle of 30 electrical degrees between respective magnetic axes of the two three-phase stator windings. In an electric drive system of the kind mentioned above, each of the converters needs information indicative of a rotational position of the rotor of the electric machine. Typically, a converter such as e.g. a frequency converter comprises a signal transfer interface for transmitting an excitation signal to a resolver and for receiving, from the resolver, alternating signals whose amplitudes are dependent on a rotational position of the resolver so that envelopes of the alternating signals have a mutual phase shift. A straightforward approach is to use as many resolvers as there are converters, but it would be more cost effective to use a single resolver for all the converters. Furthermore, from the viewpoint of product portfolio management, it is advantageous that mutually similar converters can be used for the different winding systems of the electric machine.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments.

In accordance with the invention, there is provided a new positioning device for producing a position signal indicative of a rotational position of a resolver. A positioning device according to the invention comprises:
- a signal interface for receiving a first alternating signal and a second alternating signal, amplitudes of the first and second alternating signals being dependent on the rotational position of the resolver so that envelopes of the first and second alternating signals have a mutual phase shift, and
- a processing system for generating the position signal based on the amplitudes of the first and second alternating signals and on polarity information indicative of a polarity of an excitation signal of the resolver.

The processing system of the positioning device is configured to:
- recognize a polarity indicator, such as e.g. a change of frequency or a change of phase, on the waveform of the first alternating signal and/or on the waveform of the second alternating signal, and
- determine the polarity information based on the recognized polarity indicator.

As the polarity information expressing the polarity of the excitation signal is included in the first and second alternating signals, there is no need for a separate signaling channel for transferring the polarity information to the positioning device.

In accordance with the invention, there is provided also a new excitation device for producing an excitation signal for a resolver. An excitation device according to the invention comprises:
- a signal generator for generating the excitation signal,
- a signal interface for transmitting the excitation signal to the resolver, and
- a modulator for modulating the waveform of the excitation signal to contain a polarity indicator expressing a polarity of the excitation signal when the polarity indicator is detected on a signal being the excitation signal multiplied with a gain having an unknown sign.

In accordance with the invention, there is provided also a new converter for controlling voltages of a winding system of an electric machine. The converter can be for example a frequency converter. A converter according to the invention comprises a positioning device according to the invention and/or an excitation device according to the invention.

In accordance with the invention, there is provided also a new converter system that comprises two or more converters according to the invention for controlling voltages of two or more winding systems of one or more electric machines.

In a converter system according to an exemplifying and non-limiting embodiment, each converter comprises a positioning device according to the invention and an excitation device according to the invention. In this exemplifying case, one of the converters is configured to transmit an excitation signal to a resolver connected to an electric machine and all the converters are configured to receive, from the resolver, alternating signals whose amplitudes are dependent on the rotational position of the resolver so that envelopes of the alternating signals have a mutual phase shift. Therefore, only one resolver is needed. Furthermore, the converters can be like each other.

In accordance with the invention, there is provided also a new electric drive system that comprises:
- one or more electric machines comprising two or more winding systems,
- a resolver for detecting a rotational position of the one or more electric machines, and
- a converter system according to the invention for controlling the one or more electric machines.

The electric drive system may comprise for example an electric machine having at least two winding systems so that directions of the respective magnetic axes of the winding systems are different from each other. The electric machine may comprise for example two three-phase stator windings so that there is an angle of 30 electrical degrees between the respective magnetic axes of the two three-phase stator windings. It is however also possible that there are two or more electric machines so that the shafts of the electric machines are mechanically interconnected directly or with a gear so that the rotational positions of the shafts are bound to each other.

In accordance with the invention, there is provided also a new method for producing a position signal indicative of a rotational position of a resolver. A method according to the invention comprises:
- receiving a first alternative signal and a second alternative signal from the resolver, amplitudes of the first and second alternative signals being dependent on the rotational position of the resolver so that envelopes of the first and second alternative signals have a mutual phase shift,
- recognizing a polarity indicator on the waveform of the first alternating signal and/or on the waveform of the second alternating signal,
- determining, based on the recognized polarity indicator, polarity information indicative of a polarity of an excitation signal of the resolver, and
- generating the position signal based on the amplitudes of the first and second alternating signals and on the polarity information.

Various exemplifying and non-limiting embodiments are described in accompanied dependent claims.

Exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DETAILED DESCRIPTION

The specific examples provided in the description below should not be construed as limiting the scope and/or the applicability of the accompanied claims. Lists and groups of examples provided in the description are not exhaustive unless otherwise explicitly stated.

Figure 1:
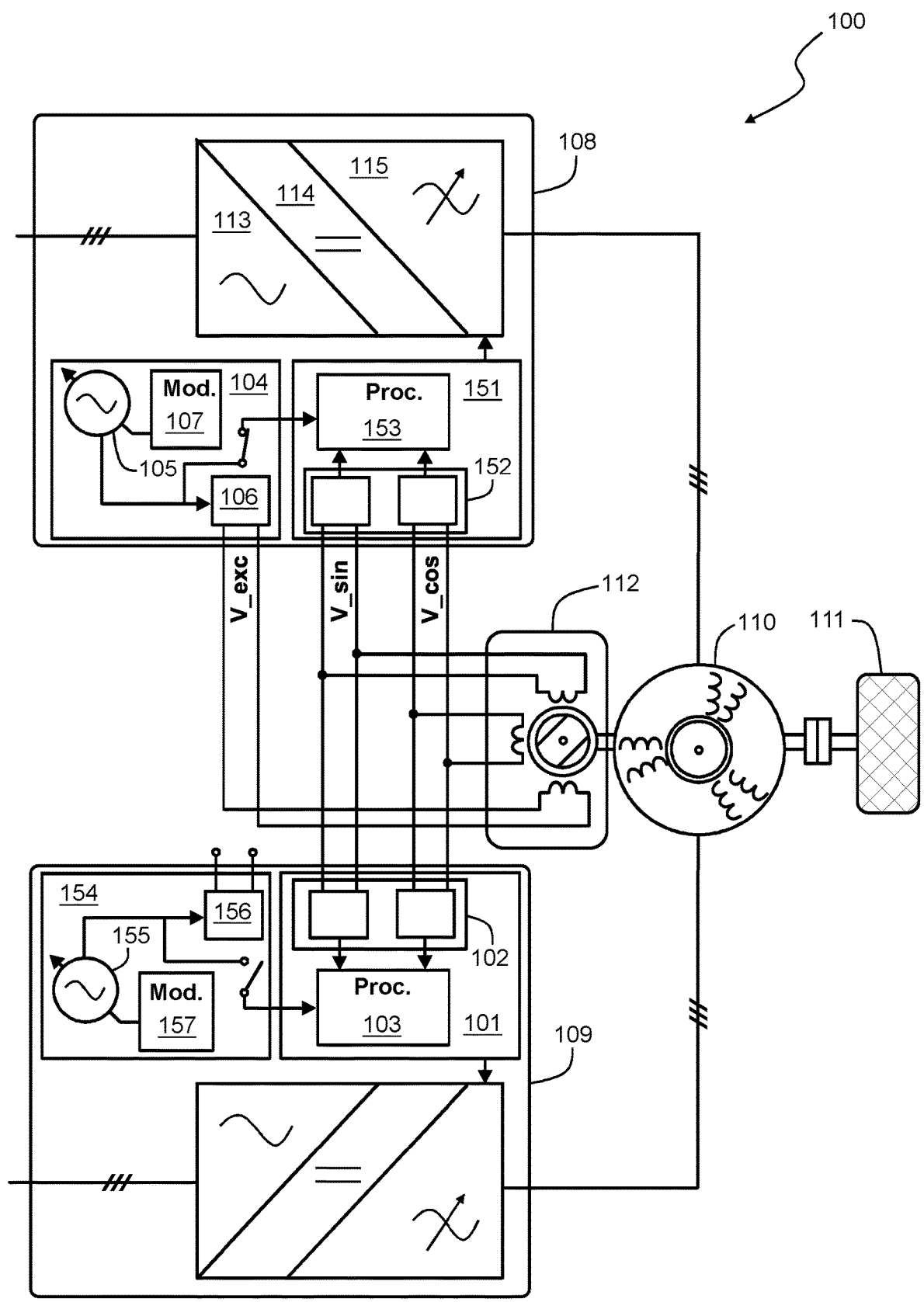
FIG. 1 shows a schematic illustration of an electric drive system comprising a positioning device according to an exemplifying and non-limiting embodiment and an excitation device according to an exemplifying and non-limiting embodiment.

FIG. 1 shows a schematic illustration of an electric drive system 100 according to an exemplifying and non-limiting embodiment. The electric drive system comprises an electric machine 110 comprising two winding systems. In this exemplifying case, the electric machine comprises two three-phase stator windings so that there is an angle of 30 electrical degrees between the respective magnetic axes of the two three-phase stator windings. The electric machine 110 can be, for example but not necessarily, a permanent magnet synchronous machine, an electrically excited synchronous machine, an induction machine, or a synchronous reluctance machine. The electric machine 110 is arranged to drive an actuator 111. The actuator 111 can be, for example but not necessarily, a wheel, a chain track, a hydraulic pump, a cutter of a wood chipping machine, or some other actuator.

The electric drive system 100 comprises a resolver 112 for detecting a rotational position of a rotor of the electric machine 110. The resolver 112 can be for example a variable reluctance "VR" resolver. It is, however, also possible that the resolver is a wound-rotor resolver that comprises brushes or a rotary transformer for transferring an excitation signal to a rotor winding of the resolver. The resolver 112 receives an alternating excitation signal V_exc and produces first and second alternating signals V_cos and V_sin whose amplitudes are dependent on the rotational position of the resolver 112 so that envelopes of the first and second alternating signals have a mutual phase shift. The excitation signal V_exc and the first and second alternating signals V_cos and V_sin can be modelled with the following equations:

$$V\_exc = V(t)\sin(\varphi(t)),$$

$$V\_sin = V(t)\sin(\varphi(t)+\varphi_c) \times TR\ \sin(\Theta), \quad (1)$$

$$V\_cos = V(t)\sin(\varphi(t)+\varphi_c) \times TR\ \cos(\Theta),$$

where t is time, V is amplitude of the excitation signal V_exc, TR is a maximum transformation ratio between an excitation winding of the resolver 112 and output windings of the resolver 112, φ is a time-dependent phase of the excitation signal V_exc, $\varphi_c$ is a phase shift caused by iron and copper losses in the resolver 112, and Θ is the electrical rotational angle of the rotor of the resolver 112. The frequency $(d\varphi/dt)/2\pi$ of the excitation signal V_exc can be time dependent or constant. Correspondingly, the amplitude V of the excitation signal V_exc can be constant or time-dependent. In the exemplifying case illustrated with the aid of equations 1, the above-mentioned phase shift between the envelopes of the first and second alternating signals V_cos and V_sin is 90 degrees of the electrical angle Θ.

The electric drive system 100 comprises a converter system for controlling voltages of the two winding systems of the electric machine 110. The converter system comprises a converter 108 for controlling voltages of a first one of the winding systems and a converter 109 for controlling voltages of the second one of the winding systems. In this exemplifying case, each of the converters is a frequency converter.

The converter 108 comprises an inverter stage 115 for producing controllable alternating voltages, a rectifier stage 113 for rectifying alternating voltage supplied to the converter 108, and an intermediate circuit 114 between the rectifier stage 113 and the inverter stage 115. The converter 108 further comprises an excitation device 104 for producing the excitation signal V_exc for the resolver 112. The excitation device 104 comprises a signal generator 105 for generating the excitation signal V_exc and a signal interface 106 for transmitting the excitation signal V_exc to the resolver 112. The excitation device 104 further comprises a modulator 107 for modulating the waveform of the excitation signal V_exc to contain a polarity indicator that is capable of expressing the polarity of the excitation signal V_exc when the polarity indicator is detected on a signal being the excitation signal V_exc multiplied with a gain having an unknown sign. The gain having the unknown sign is the TR cos(Θ) or the TR sin(Θ) presented in equations 1 above.

The converter 108 comprises a positioning device 151 for producing a first position signal indicative of the rotational position of the resolver 112. The inverter stage 115 of the converter 108 comprises a control system for controlling the voltages supplied to the first one of the winding systems of the electric machine 110 on the basis of the first position signal and other control quantities such as e.g.: measured or estimated rotational speed of the electric machine 110, measured or estimated torque generated by the electric machine 110, a reference speed, a reference torque, and/or one or more other control quantities.

The positioning device 151 of the converter 108 comprises a signal interface 152 for receiving the first and second alternating signals V_cos and V_sin and a processing system 153 for generating the above-mentioned first position signal based on the amplitudes of the first and second alternating signals V_cos and V_sin and the polarity of the excitation signal V_exc. The polarity, i.e. the sign, of the excitation signal V_exc at a given moment of time is compared to the polarities of the first and second alternating signals V_cos and V_sin at this moment of time in order to find out whether the cos(Θ) shown in equations 1 is positive or negative and to find out whether the sin(Θ) is positive or negative. It is also possible that the phase shift $\varphi_c$ shown in equations 1 is taken into account when determining the rotational position of the resolver 112. The value of $\varphi_c$ can be an empirically determined value that can be given to the processing system 103 as a correction parameter.

The converter 109 comprises an inverter stage, a rectifier stage, and an intermediate circuit between the rectifier stage and the inverter stage. The converter 109 comprises a positioning device 101 for producing a second position signal indicative of the rotational position of the resolver 112. The inverter stage of the converter 109 controls the voltages supplied to the second one of the winding systems of the electric machine 110 on the basis of the second position signal and one or more other control quantities.

The positioning device 101 of the converter 109 comprises a signal interface 102 for receiving the first and second alternating signals V_cos and V_sin. The positioning device 101 further comprises a processing system 103 for generating the above-mentioned second position signal based on the amplitudes of the first and second alternating signals V_cos and V_sin and on polarity information indicative of the polarity of the excitation signal V_exc. The processing system 103 is configured to recognize a polarity indicator on the waveform of the first alternating signal V_cos and/or on the waveform of the second alternating signal V_sin. The processing system 103 is configured to determine the polarity information based on the recognized polarity indicator. As the polarity information expressing the polarity of the excitation signal V_exc is included in the first and second alternating signals V_cos and V_sin, there is no need for a separate signaling channel for transferring the polarity information to the positioning device 101.

In the exemplifying converter system shown in FIG. 1, the converter 109 comprises an excitation device 154 that comprises a signal generator 155, a modulator 157 for controlling the signal generator 155, and a signal interface 106 for transmitting a produced excitation signal. In the exemplifying situation shown in FIG. 1, the excitation device 154 of the converter 109 is not in use and the positioning device 151 of the converter 108 is arranged to receive the excitation signal V_exc directly from the excitation device 104 of the converter 108. In an exemplifying case where the positioning device 151 is similar to the positioning device 101, there is no need for an arrangement that enables the positioning device 151 to receive the excitation signal V_exc directly from the excitation device 104. The excitation devices 104 and 154 are advantageously similar to each other and the positioning devices 101 and 151 advantageously similar to each other. In this exemplifying case, the converters 108 and 109 can be similar to each other.

The processing system 103 of the positioning device 101 as well as the processing system 153 of the positioning device 151 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the processing system 103 as well as the processing system 153 may comprise one or more memory devices such as e.g. a random-access memory "RAM". Correspondingly, the modulator 107 as well as the modulator 157 may comprise one or more processor circuits and one or more memory devices.

Figure 2A:
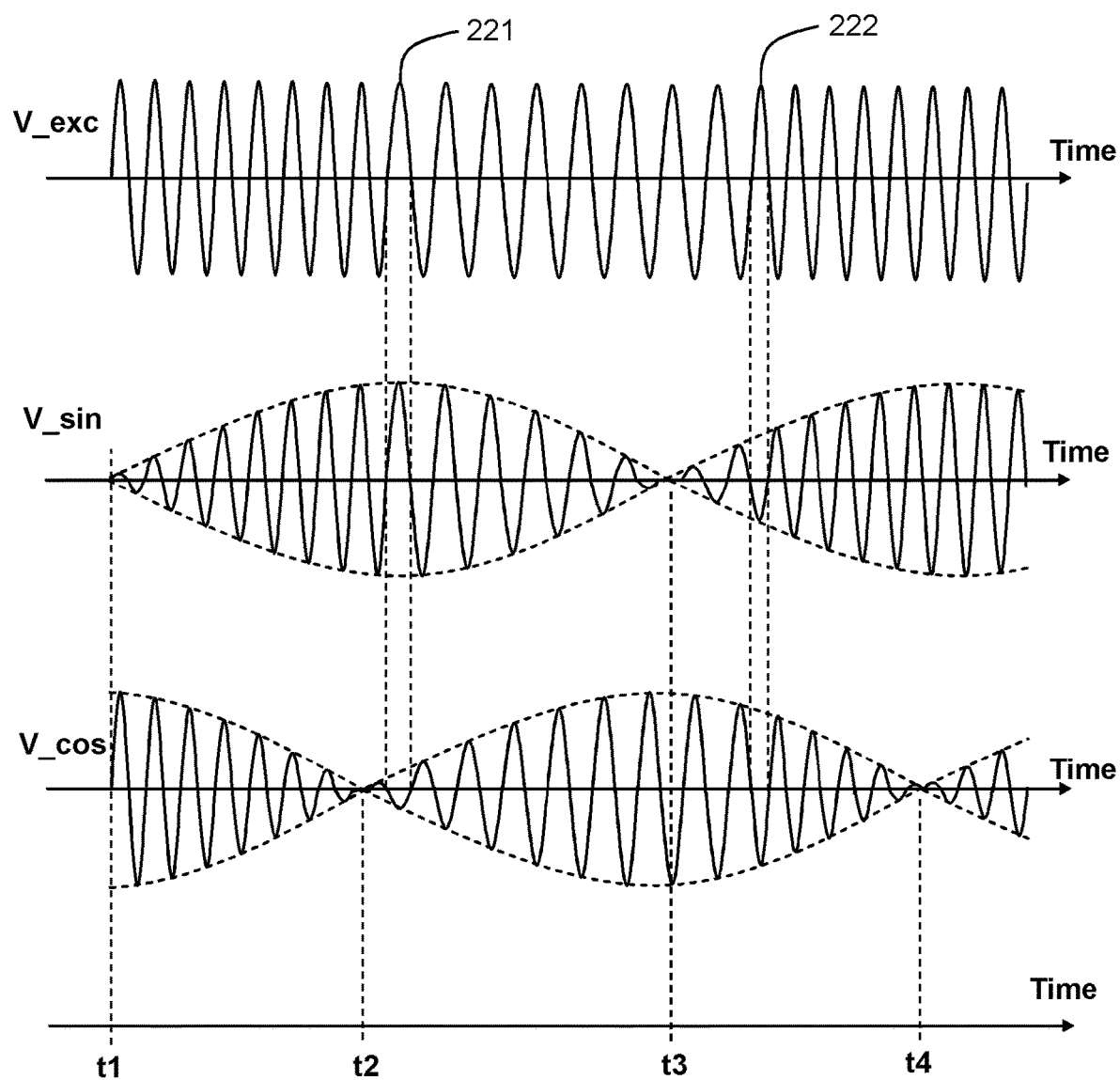
FIGS. 2a, 2b, and 2c show exemplifying waveforms of excitation signals generated by excitation devices according to exemplifying and non-limiting embodiments and corresponding exemplifying waveforms of alternating signals produced by a resolver.

FIG. 2a shows an exemplifying waveform of the excitation signal V_exc generated by an excitation device according to an exemplifying and non-limiting embodiment. Furthermore, FIG. 2a shows the corresponding exemplifying waveforms of the first and second alternating signals V_cos and V_sin produced by the resolver 112 shown in FIG. 1. In this exemplifying case, the modulator 107 shown in FIG. 1 is configured to modulate the waveform of the excitation signal V_exc to contain changes of frequency so that the excitation signal V_exc has a predetermined polarity at a moment of occurrence of each change of frequency. Thus, the frequency (dφ/dt)/2π of the excitation signal V_exc is varied. In the exemplifying case illustrated in FIG. 2a, the first pulse after each change of frequency is positive. FIG. 2a shows two changes of frequency and the first pulses after these changes of frequency are denoted with references 221 and 222. In the exemplifying case shown in FIG. 2a, the frequency of the excitation signal V_exc has two possible values i.e. the signal generator 105 shown in FIG. 1 is controlled according to the 0101 . . . frequency shift keying "FSK". It is also possible to use more than two frequency values.

In a positioning device according to an exemplifying and non-limiting embodiment, the processing system 103 shown in FIG. 1 is configured to recognize a change of frequency of the first alternating signal V_cos and/or a change of frequency of the second alternating signal V_sin, and to determine the polarity of the excitation signal V_exc based on the recognized change of frequency. As shown in FIG. 2a, pulses of the first alternating signal V_cos which corresponds to the pulses 221 and 222 of the excitation signal V_exc are negative. Thus, the processing system 103 can determine that the cos(Θ) shown in equations 1 is negative during a time period from t2 to t4. As shown in FIG. 2a, a pulse of the second alternating signal V_sin which corresponds to the pulse 221 of the excitation signal V_exc is positive and a pulse of the second alternating signal V_sin which corresponds to the pulse 222 of the excitation signal V_exc is negative. Thus, the processing system 103 can determine that the sin(Θ) shown in equations 1 is positive during a time period from t1 to t3 and negative during a time period from t3 to a next moment of time where the amplitude of the second alternating signal V_sin is zero.

Figure 2B:
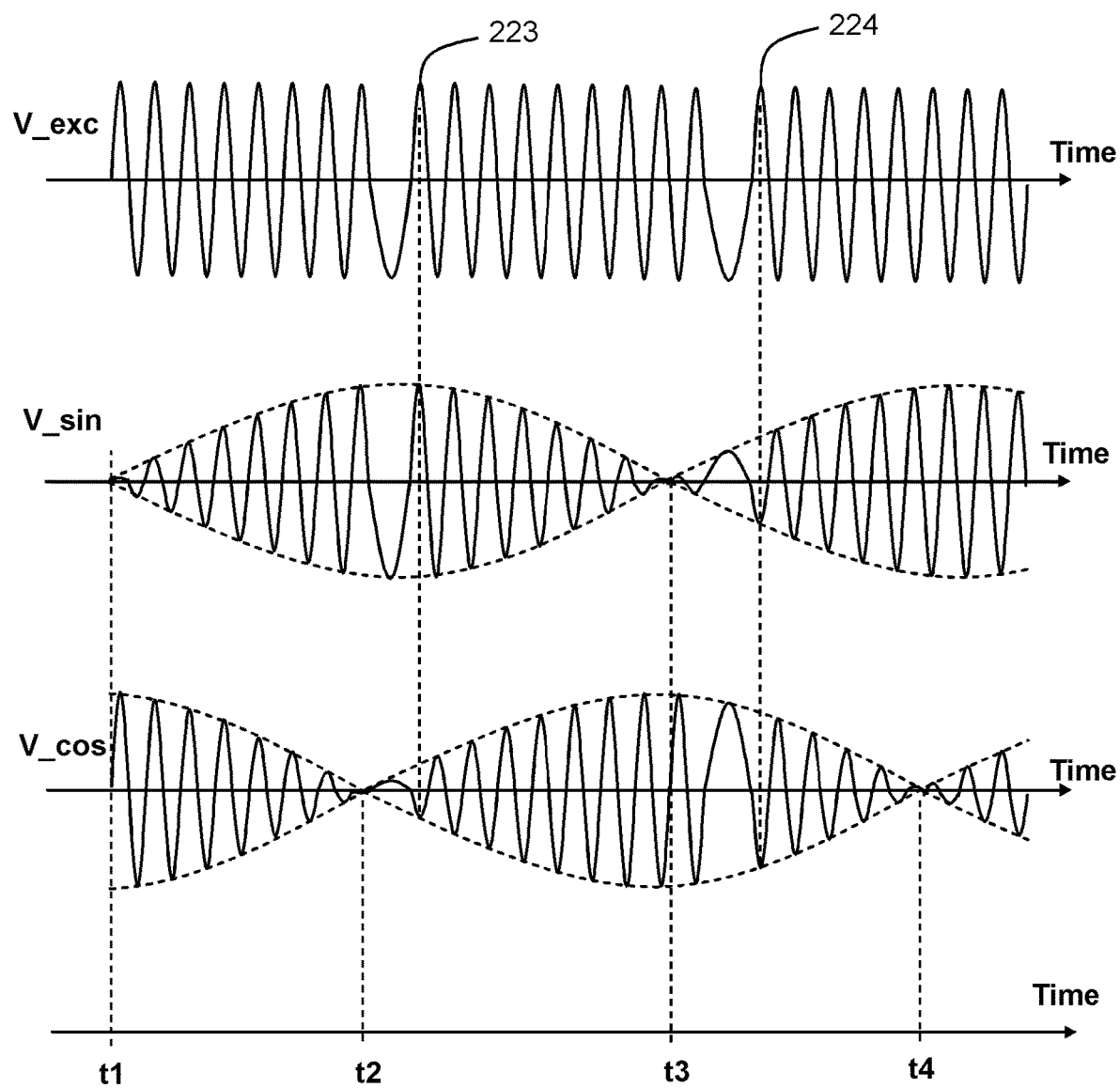

FIG. 2b shows an exemplifying waveform of the excitation signal V_exc generated by an excitation device according to an exemplifying and non-limiting embodiment. Furthermore, FIG. 2b shows the corresponding exemplifying waveforms of the first and second alternating signals V_cos and V_sin produced by the resolver 112 shown in FIG. 1. In this exemplifying case, the modulator 107 shown in FIG. 1 is configured to modulate the waveform of the excitation signal V_exc to contain changes of phase so that the excitation signal V_exc has a predetermined polarity at a moment of occurrence of each change of phase. In the exemplifying case illustrated in FIG. 2b, the first pulse after each change of phase is positive. FIG. 2b shows two changes of phase and the first pulses after these changes of phase are denoted with references 223 and 224. In the exemplifying case shown in FIG. 2b, the phase of the excitation signal V_exc has many possible values i.e. the signal generator 105 shown in FIG. 1 is controlled according to a phase shift keying "PSK".

In a positioning device according to an exemplifying and non-limiting embodiment, the processing system 103 shown in FIG. 1 is configured to recognize a change of phase of the first alternating signal V_cos and/or a change of phase of the second alternating signal V_sin, and to determine the polarity of the excitation signal V_exc based on the recognized change of phase. As shown in FIG. 2b, pulses of the first alternating signal V_cos which corresponds to the pulses 223 and 224 of the excitation signal V_exc are negative. Thus, the processing system 103 can determine that the cos(Θ) shown in equations 1 is negative during a time period from t2 to t4. As shown in FIG. 2b, a pulse of the second alternating signal V_sin which corresponds to the pulse 223 of the excitation signal V_exc is positive and a pulse of the second alternating signal V_sin which corresponds to the pulse 224 of the excitation signal V_exc is negative. Thus, the processing system 103 can determine that the sin(Θ) shown in equations 1 is positive during a time period from t1 to t3 and negative during a time period from t3 to a next moment of time where the amplitude of the second alternating signal V_sin is zero.

In a positioning device according to an exemplifying and non-limiting embodiment, the processing system 103 shown in FIG. 1 is configured to constitute a zero-crossing detector for recognizing zero-crossings of the waveform of the first alternating signal V_cos and/or zero-crossings of the waveform of the second alternating signal V_sin to recognize the above-mentioned changes of frequency or the above-mentioned changes of phase.

Figure 2C:
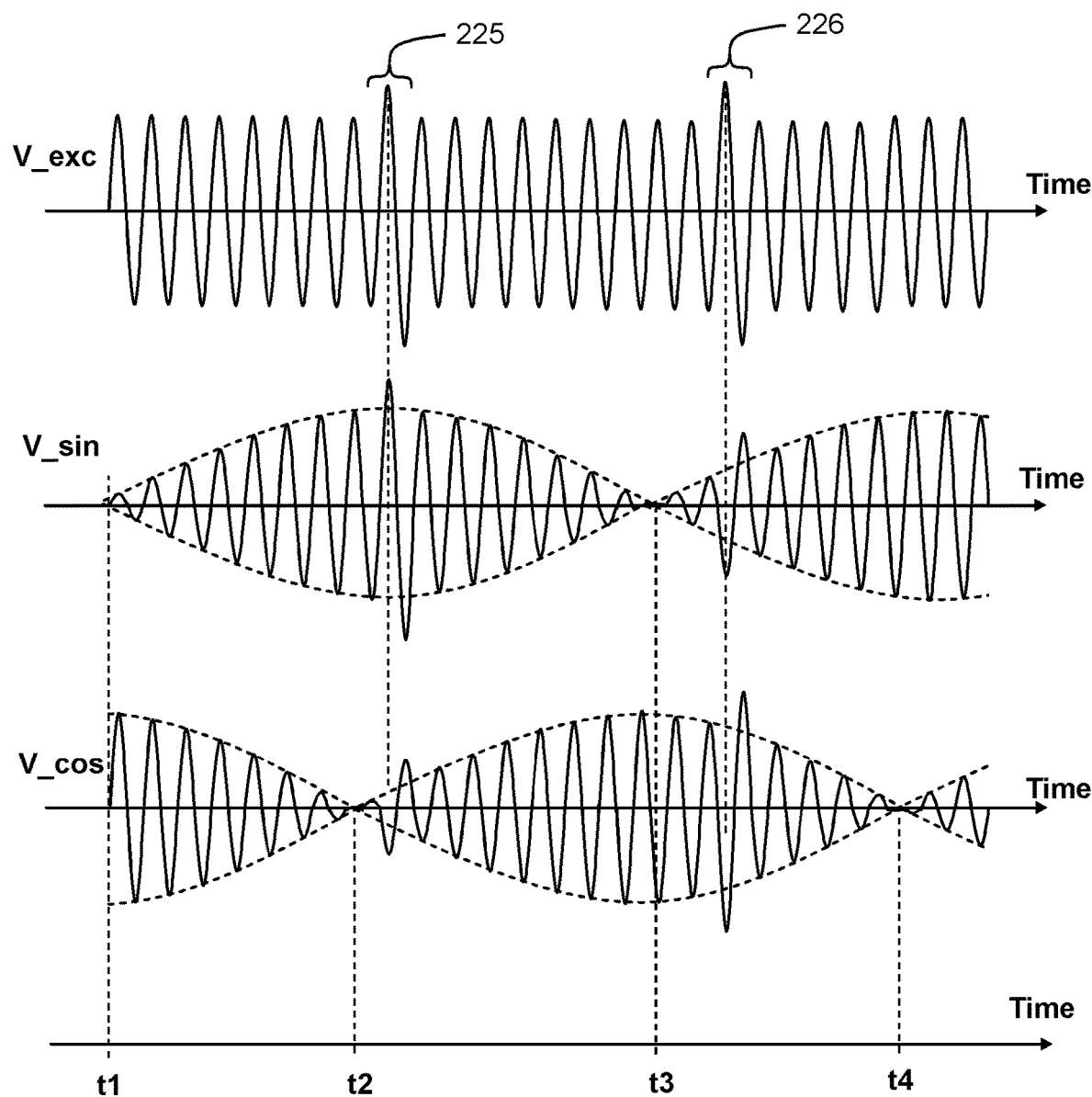

FIG. 2c shows an exemplifying waveform of the excitation signal V_exc generated by an excitation device according to an exemplifying and non-limiting embodiment. Furthermore, FIG. 2c shows the corresponding exemplifying waveforms of the first and second alternating signals V_cos and V_sin produced by the resolver 112 shown in FIG. 1. In this exemplifying case, the modulator 107 shown in FIG. 1 is configured to modulate the waveform of the excitation signal V_exc to contain predetermined waveform patterns so that the excitation signal V_exc has a predetermined polarity at a moment of occurrence of each predetermined waveform pattern. In the exemplifying case illustrated in FIG. 2c, the predetermined waveform pattern comprises a positive pulse and a subsequent negative pulse of the excitation signal V_exc so that the amplitudes of these pulses are greater than amplitudes of the neighboring pulses of the excitation signal V_exc. FIG. 2c shows two waveform patterns 225 and 226. In the exemplifying case shown in FIG. 2c, the signal generator 105 is controlled according to amplitude modulation. The amplitudes of the positive and negative pulses constituting the predetermined waveform pattern need to be so high that the predetermined waveform pattern is recognizable on the waveforms of the first and second alternating signals V_cos and V_sin also in situations where $d(\sin(\Theta))/dt$ or $d(\cos(\Theta))/dt$ reaches its maximum absolute value.

In a positioning device according to an exemplifying and non-limiting embodiment, the processing system 103 shown in FIG. 1 is configured to compare the waveform of the first alternating signal V_cos and/or the waveform of the second alternating signal V_sin to the above-mentioned predetermined waveform pattern and, in response to a match in the above-presented comparison, to determine the polarity of the excitation signal V_exc based on a part of the first alternating signal and/or a part of the second alternating signal matching the predetermined waveform pattern. For example, the processing system 103 can be configured to compare amplitudes of successive positive pulses of V_cos or V_sin to each other and amplitudes of successive negative pulses to each other to recognize a situation where successive pulses with opposite polarities have amplitudes greater than amplitudes of the neighboring pulses. As shown in FIG. 2c, pulses of the first alternating signal V_cos which correspond to the waveform patterns 225 and 226 of the excitation signal V_exc have opposite polarities with respect to corresponding pulses of the waveform patterns 225 and 226 of the excitation signal V_exc. Thus, the processing system 103 can determine that the cos(Θ) shown in equations 1 is negative during a time period from t2 to t4. As shown in FIG. 2c, pulses of the second alternating signal V_sin which correspond to the waveform pattern 225 of the excitation signal V_exc have same polarities as the corresponding pulses of the waveform pattern 225 of the excitation signal V_exc, and pulses of the second alternating signal V_sin which correspond to the waveform pattern 226 of the excitation signal V_exc have opposite polarities with respect to the corresponding pulses of the waveform pattern 226. Thus, the processing system 103 can determine that the $\sin(\Theta)$ shown in equations 1 is positive during a time period from t1 to t3 and negative during a time period from t3 to a next moment of time where the amplitude of the second alternating signal V_sin is zero.

In an excitation device according to an exemplifying and non-limiting embodiment, the modulator 107 shown in FIG. 1 is configured to receive the first and second alternating signals V_cos and V_sin and to change the frequency of the excitation signal V_exc at zero-crossings of the envelopes of the first and second alternating signals V_cos and V_sin. The frequency of the excitation signal V_exc may have for example four possible frequency values $f_1$, $f_2$, $f_3$, and $f_4$ so that the frequency of the excitation signal is $f_1$ when both the $\cos(\Theta)$ and the $\sin(\Theta)$ shown in equations 1 are positive, the frequency is $f_2$ when the $\cos(\Theta) \leq 0$ and the $\sin(\Theta) > 0$, the frequency is $f_3$ when the $\cos(\Theta) > 0$ and the $\sin(\Theta) \leq 0$, and the frequency is $f_4$ when the $\cos(\Theta) \leq 0$ and the $\sin(\Theta) \leq 0$. In this exemplifying case, the frequency of the excitation signal V_exc indicates directly the signs of the $\cos(\Theta)$ and the $\sin(\Theta)$. The frequency of the excitation signal V_exc acts as a polarity indicator indirectly so that the polarity of the excitation signal V_exc is e.g. the polarity of the first alternating signal V_cos when the frequency is $f_1$ or $f_3$, and opposite to the polarity of the first alternating signal V_cos when the frequency is $f_2$ or $f_4$. In a positioning device according to an exemplifying and non-limiting embodiment, the processing system 103 shown in FIG. 1 is configured to recognize the frequency of the first alternating signal V_cos and/or the frequency of the second alternating signal V_sin, wherein the recognized frequency indicates the signs of the $\cos(\Theta)$ and the $\sin(\Theta)$ and represents polarity information that indicates the polarity of the excitation signal in the above-explained way.

Figure 3:
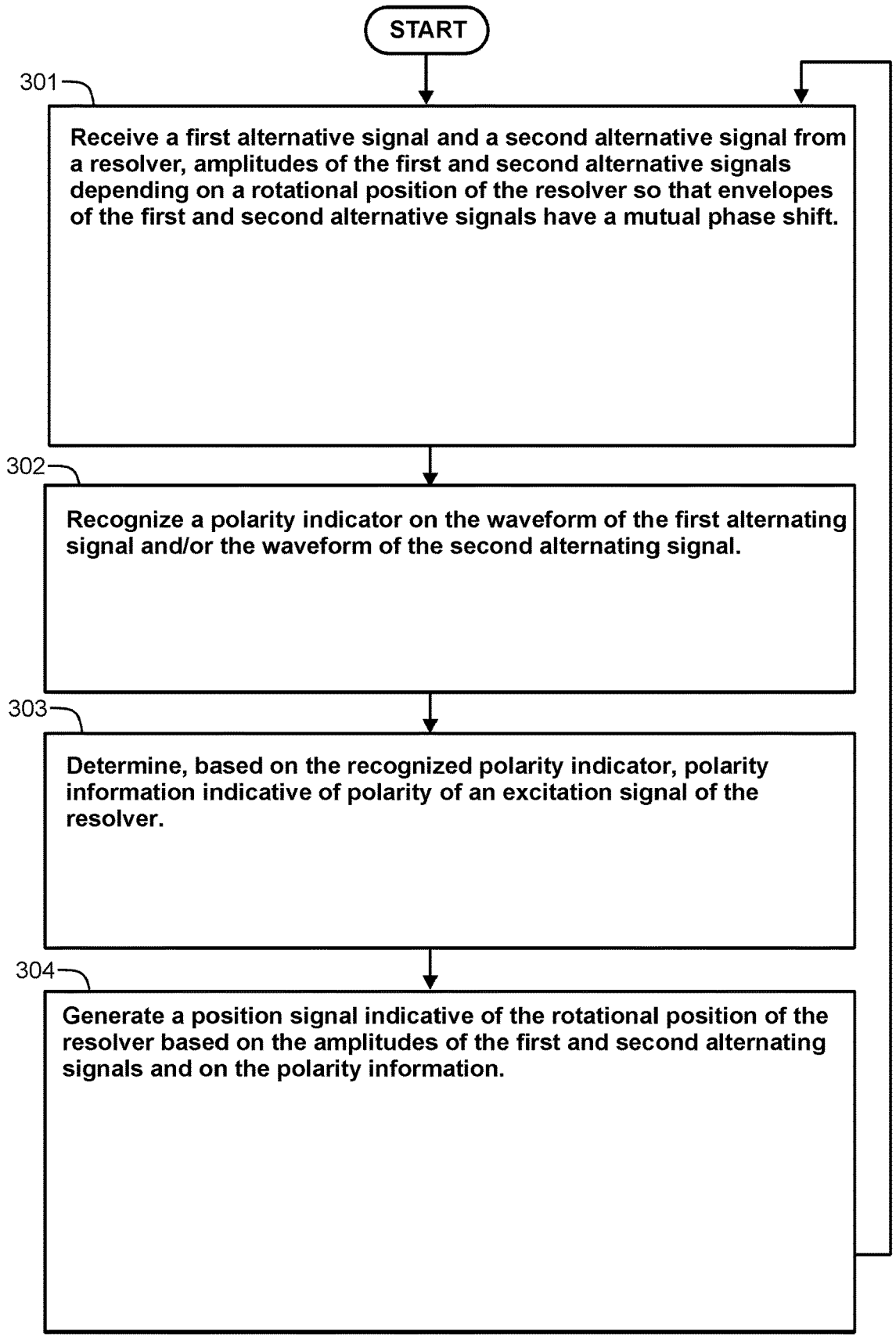
FIG. 3 shows a flowchart of a method according to an exemplifying and non-limiting embodiment for producing a position signal indicative of a rotational position of a resolver.

FIG. 3 shows a flowchart of a method according to an exemplifying and non-limiting embodiment for producing a position signal indicative of a rotational position of a resolver. The method comprises the following actions:

action 301: receiving a first alternative signal and a second alternative signal from the resolver, amplitudes of the first and second alternative signals being dependent on the rotational position of the resolver so that envelopes of the first and second alternative signals have a mutual phase shift, action 302: recognizing a polarity indicator on the waveform of the first alternating signal and/or the waveform of the second alternating signal, action 303: determining, based on the recognized polarity indicator, polarity information indicative of a polarity of an excitation signal of the resolver, and action 304: generating the position signal indicative of the rotational position of the resolver based on the amplitudes of the first and second alternating signals and on the polarity information.

In a method according to an exemplifying and non-limiting embodiment, the recognizing a polarity indicator comprises recognizing a change of phase or a change of frequency of the first alternating signal and/or a change of phase or a change of frequency of the second alternating signal. In a method according to this exemplifying and non-limiting embodiment, the polarity information is determined based on the recognized change of phase or the recognized change of frequency.

In a method according to an exemplifying and non-limiting embodiment, the recognizing a polarity indicator comprises comparing the waveform of the first alternating signal and/or the waveform of the second alternating signal to a predetermined waveform pattern. In a method according to this exemplifying and non-limiting embodiment, the polarity information is determined based on a part of the first alternating signal and/or a part of the second alternating signal matching the predetermined waveform pattern.

The specific examples provided in the description given above should not be construed as limiting the scope and/or the applicability of the appended claims. List and groups of examples provided in the description given above are not exhaustive unless otherwise explicitly stated.

What is claimed is:

1. A positioning device for producing a position signal indicative of a rotational position of a resolver, the positioning device comprising:
a signal interface configured to receive a first alternating signal (V_cos) and a second alternating signal (V_sin), amplitudes of the first and second alternating signals being dependent on the rotational position of the resolver so that envelopes of the first and second alternating signals have a mutual phase shift, and
a processing system configured to generate the position signal based on the amplitudes of the first and second alternating signals and on polarity information indicative of a polarity of an excitation signal of the resolver, wherein the processing system is configured to:
recognize a polarity indicator related to the polarity of the excitation signal on a waveform of at least the first alternating signal, and
determine the polarity information based on the recognized polarity indicator.

2. The positioning device according to claim 1, wherein the processing system is configured to recognize a change of phase or a change of frequency of the first alternating signal and to determine the polarity information based on the recognized change of phase or the recognized change of frequency.

3. The positioning device according to claim 2, wherein the processing system is configured to constitute a zero-crossing detector for recognizing zero-crossings of the waveform of the first alternating signal to recognize the change of phase or the change of frequency.

4. The positioning device according to claim 1, wherein the processing system is configured to compare the waveform of the first alternating signal to a predetermined waveform pattern and, in response to a match between the waveform of the first alternating signal and the predetermined waveform pattern, to determine the polarity information based on a part of the first alternating signal matching the predetermined waveform pattern.

5. The positioning device according to claim 1, wherein the processing system is configured to recognize the polarity indicator on both the waveform of the first alternating signal and a waveform of the second alternating signal.

6. A converter for controlling voltages of a winding system of an electric machine, the converter comprising the positioning device according to claim 1 for producing the position signal indicative of the rotational position of the resolver connected to a rotor of the electric machine.

7. The converter according to claim 6, wherein the converter further comprises an excitation device for producing an excitation signal for the resolver.

8. The converter according to claim 6, wherein the converter is a frequency converter.

9. A method comprising:

receiving a first alternative signal and a second alternative signal from a resolver, amplitudes of the first and second alternating signals being dependent on a rotational position of the resolver so that envelopes of the first and second alternating signals have a mutual phase shift, and generating a position signal indicative of the rotational position of the resolver based on the amplitudes of the first and second alternating signals and on polarity information indicative of a polarity of an excitation signal of the resolver, wherein the method comprises:

recognizing a polarity indicator related to the polarity of the excitation signal on a waveform of at least the first alternating signal, and determining the polarity information based on the recognized polarity indicator.

\* \* \* \* \*